UNITED STATES PATENT OFFICE.

ARTHUR TOWNE, OF BOSTON, MASSACHUSETTS.

IMPROVEMENT IN BRONZING COMPOUNDS.

Specification forming part of Letters Patent No. 149,004, dated March 24, 1874; application filed August 16, 1873.

*To all whom it may concern:*

Be it known that I, ARTHUR TOWNE, of Boston, in the county of Suffolk and State of Massachusetts, have invented an Improved Bronzing Compound; and I hereby declare the following to be a full, clear, and exact description of the same.

This invention has for its object to provide a cheap bronzing compound which will firmly adhere to the surface to which it is applied, and will dry rapidly; and consists in a compound of pine-pitch and balsam of fir mixed with benzine or turpentine and sulphuric ether, bronzing-powder being afterward added.

To enable others skilled in the art to understand and use my invention, I will proceed to describe the manner in which I have carried it out.

I take one pound of balsam of fir and two pounds of pine-pitch, mixed together, and cut or dissolve them in three quarts of benzine. I then add from ten to fifteen drops of sulphuric ether, which causes the compound, when applied, to set quickly. A quantity of bronzing or metallic powder of any required color, sufficient to produce the desired body, is then added, and the mixture is thoroughly stirred when it is ready for use, and may be applied with an ordinary brush.

By using pine-pitch in connection with balsam of fir to render the compound adhesive, instead of balsam of fir only, I am enabled to greatly reduce the expense of manufacture, as the cost of pine-pitch is only about one-eighth of that of balsam of fir.

Where the compound is to be used on surfaces which are exposed to the weather, or upon the bottoms of boats or vessels, turpentine may be used to advantage, instead of benzine, for cutting or dissolving the pine-pitch and balsam of fir; but for inside work I prefer benzine, as it causes the compound to dry more rapidly after it is applied, and brings out the color of the bronze.

What I claim as my invention, and desire to secure by Letters Patent, is—

A bronzing compound consisting of pine-pitch and balsam of fir mixed with benzine or turpentine, sulphuric ether, and bronzing-powder, in about the proportions named, substantially as described.

Witness my hand this 13th day of August, A. D. 1873.

ARTHUR TOWNE.

In presence of—
P. E. TESCHEMACHER,
W. J. CAMBRIDGE.